United States Patent
Han et al.

(10) Patent No.: US 8,862,636 B2
(45) Date of Patent: Oct. 14, 2014

(54) SCALABLE ALGORITHMS FOR MAPPING-BASED XML TRANSFORMATION

(75) Inventors: Wook-Shin Han, Daegu (KR); Ching-Tien Ho, San Jose, CA (US); Haifeng Jiang, San Jose, CA (US); Lucian Popa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 12/134,029

(22) Filed: Jun. 5, 2008

(65) Prior Publication Data

US 2008/0275907 A1    Nov. 6, 2008

Related U.S. Application Data

(63) Continuation of application No. 11/690,639, filed on Mar. 23, 2007, now abandoned.

(51) Int. Cl.
| | | |
|---|---|---|
| *G06F 7/00* | (2006.01) | |
| *G06F 17/30* | (2006.01) | |
| *G06F 17/22* | (2006.01) | |
| *G06F 17/00* | (2006.01) | |

(52) U.S. Cl.
CPC ........ *G06F 17/2247* (2013.01); *G06F 17/2264* (2013.01); *Y10S 707/957* (2013.01)
USPC ............................. 707/809; 707/811; 707/957

(58) Field of Classification Search
CPC .................... G06F 17/30569; G06F 17/30911; G06F 17/30914; G06F 17/30923
USPC ............ 707/809, 999.001–999.005, 811, 957
See application file for complete search history.

(56) References Cited

U.S. PATENT DOCUMENTS

| | | | |
|---|---|---|---|
| 5,778,400 A | 7/1998 | Tateno | |
| 6,604,100 B1 * | 8/2003 | Fernandez et al. | ..................... 1/1 |
| 6,799,184 B2 | 9/2004 | Bhatt et al. | |
| 6,850,950 B1 | 2/2005 | Clarke et al. | |
| 6,883,137 B1 * | 4/2005 | Girardot et al. | ................ 715/242 |
| 7,107,524 B2 | 9/2006 | Lin et al. | |
| 7,174,327 B2 | 2/2007 | Chau et al. | |
| 7,353,222 B2 * | 4/2008 | Dodds et al. | ........... 707/999.003 |
| 7,392,239 B2 * | 6/2008 | Fontoura et al. | ....... 707/999.003 |
| 7,870,143 B2 * | 1/2011 | Calahan | ......................... 707/809 |
| 2001/0047372 A1 | 11/2001 | Gorelik et al. | |
| 2002/0124020 A1 | 9/2002 | Janakiraman et al. | |

(Continued)

OTHER PUBLICATIONS

L. Fegaras, D. Levine, S. Bose, and V. Chaluvadi, "Query Processing of Streamed XML Data," Proc. 11th Int'l Conf. Information and Knowledge Management, Nov. 2002.*

(Continued)

*Primary Examiner* — Kannan Shanmugasundaram
(74) *Attorney, Agent, or Firm* — Shimokaji & Associates, P.C.

(57) ABSTRACT

A computer-implemented method for use with an extensible markup language (XML) document includes inputting a high-level mapping specification for a schema mapping; and generating a target XML document based on the mapping. The method may perform schema mapping-based XML transformation as a three-phase process comprising tuple extraction, XML-fragment generation, and data merging. The tuple extraction phase may be adapted to handle streamed XML data (as well as stored/indexed XML data). The data merging phase may use a hybrid method that can dynamically switch between main memory-based and disk-based algorithms based on the size of the XML data to be merged.

15 Claims, 6 Drawing Sheets

(56) References Cited

U.S. PATENT DOCUMENTS

| | | | |
|---|---|---|---|
| 2002/0133484 A1* | 9/2002 | Chau et al. | 707/3 |
| 2003/0014397 A1* | 1/2003 | Chau et al. | 707/3 |
| 2003/0212664 A1* | 11/2003 | Breining et al. | 707/3 |
| 2004/0040036 A1* | 2/2004 | An | 725/39 |
| 2004/0167864 A1* | 8/2004 | Wang et al. | 707/1 |
| 2004/0205082 A1* | 10/2004 | Fontoura et al. | 707/101 |
| 2004/0261019 A1* | 12/2004 | Imamura et al. | 715/513 |
| 2005/0022115 A1* | 1/2005 | Baumgartner et al. | 715/513 |
| 2005/0108633 A1 | 5/2005 | Sahota et al. | |
| 2005/0273772 A1* | 12/2005 | Matsakis et al. | 717/136 |
| 2006/0053366 A1* | 3/2006 | Abe et al. | 715/513 |
| 2006/0101073 A1* | 5/2006 | Popa et al. | 707/104.1 |
| 2007/0288592 A1* | 12/2007 | Kennedy et al. | 709/217 |

OTHER PUBLICATIONS

Eugene Y. C. Wong, Alvin T. S. Chan, Hong-Va Leong, Efficient management of XML contents over wireless environment by Xstream, Proceedings of the 2004 ACM symposium on Applied computing, Mar. 14-17, 2004.*

Notice of Allowance from U.S. Appl. No. 11/690,639 dated Jul. 23, 2009.

Doss YOR920050164, "Dynamic Exception reporting Service for Heterogenous Structured", Apr. 29, 2005.

Lucian Popa et al., "Mapping XML and relational Schemas with Clio", Proceedings of the 18$^{th}$ International Conference on Data Engineeering, pp. 498-499, 2002.

* cited by examiner

SCALABLE ALGORITHMS FOR MAPPING-BASED XML TRANSFORMATION

BACKGROUND OF THE INVENTION

The present invention relates generally to the field of data transformation and integration and, more specifically, to providing scalable extensible markup language (XML) transformation based on schema mappings.

Transforming data from one format to another is frequently required in modern information systems and Web applications that need to exchange or integrate data. As XML becomes more of a standard for data exchange among applications (especially over the Web), transforming XML data (also referred to as XML-to-XML transformation) may become increasingly important. XML-to-RDB (relational database) transformation (known as XML shredding) and RDB-to-XML transformation (known as XML publishing) are special cases of XML-to-XML transformation.

Writing data transformation programs manually—even in high-level languages such as XQuery (XML Query), XSLT (eXtensible Stylesheet Language Transformation), or SQL/XML, which is an SQL (Sequential Query Language) extension for publishing tables as XML—is often time consuming and error-prone. This is because a typical data transformation task may involve restructuring, cleansing and grouping of data, and implementing such operations can easily lead to producing large programs (queries) that are hard to comprehend and often hide the semantics of the transformation. Maintaining the transformations correctly, for example as database schemas evolve, can also involve similar problems. As a result, it is desirable to have tools to assist such data transformation tasks.

Clio is an existing schema-mapping tool that provides user-friendly means to manage and facilitate the complex task of transformation and integration of heterogeneous data such as XML over the Web or in XML databases. By means of mappings from source to target schemas, Clio can help users conveniently establish the precise semantics of data transformation and integration. One of the aims of Clio is to provide high-level mapping languages and more intuitive graphical user interfaces (GUI) for users to specify transformation semantics in convenient ways. For example, the Clio system can be used to create mappings from a source schema to a target schema for data migration purposes. Also, Clio can be used for generating mappings between relational schemas and XML schemas. The user can be presented with the structure and constraints of two schemas and asked to draw correspondences between the parts of the schemas that represent the same real world entity. Correspondences can also be inferred by Clio and verified by the user. Given the two schemas and the set of correspondences between them, Clio can generate the SQL/XML (or XSLT or XQueries) queries that drive the translation of data conforming to the first (source) schema to data conforming to the second (target) schema. In the first schema-matching phase, the Clio system establishes, semi-automatically, matchings between source XML-schema elements and target XML-schema elements. In the second schema-mapping phase, the Clio system generates, also semi-automatically, a set of logical constraints (or logical mappings) that capture the precise relationship between an instance (or document) conforming to the source schema (the input to the transformation) and an instance (or document) that conforms to the target schema (the output of the transformation).

Schema mapping tools such as Clio provide user-friendly means to manage and facilitate the complex tasks of heterogeneous data transformation and integration. By means of mappings from source to target schemas, such mapping tools can help users conveniently establish the semantics of data transformation and integration. Other examples of systems that are focused on the high-level specification and generation of data transformations and data integration applications include Rondo, a generic platform for managing and manipulating models, such as schemas, together with the mappings between them. As in Clio, mappings may be specified by using logical constraints. Other examples include Piazza and HePToX (HEterogeneous Peer TO peer Xml database system), which are also based on mappings but focus on query rewriting for data integration, instead of data transformation. In addition, many industry tools such as Microsoft ADO.NET v3 (ER-to-SQL (Entity Relationship-to-SQL) mapping system), IBM Web Sphere Data Stage TX, Stylus Studio's XML Mapper, and IBM Rational Data Architect (which uses Clio) support the development of mappings.

The aforementioned examples of schema mapping tools solve many problems of specifying transformation semantics. The problems, however, of efficiently implementing such mapping-driven transformations and of correctly and efficiently executing mapping-driven data transformations still remain. Current practice for such data transformation is to use XSLT or XQuery generated from the mapping tools. Directly using these general query languages for transformation, however, often leads to performance problems.

SUMMARY OF THE INVENTION

In one embodiment of the present invention, a computer-implemented method for use with an extensible markup language (XML) document, comprises inputting a high-level mapping specification for a schema mapping; performing a tuple extraction phase; performing a data merging phase; and generating a target XML document based on the mapping.

In another embodiment of the present invention, a system for scalable extensible markup language (XML) transformation based on schema mappings executes processes for: performing a streaming operation for tuple extraction on a streamed XML input; and generating, based on the schema mappings, target XML fragments from the tuples extracted from streamed XML input.

In still another embodiment of the present invention, a computer program product, for use with extensible markup language (XML) data having a size, comprises a computer useable medium including a computer readable program, wherein the computer readable program when executed on a computer causes the computer to: execute a main memory-based set of instructions for merging XML fragments from the XML data; execute a disk-based set of instructions for merging XML fragments from the XML data; and dynamically switch between the main memory-based set of instructions and the disk-based set of instructions based on the size of the XML data to be merged.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide XML-to-XML transformation for mapping tools—such as, but not limited to, the Clio system—and provide systems for scalable XML transformation based on schema mappings. In one embodiment of the present invention, a mapping-based XML transformation system takes source XML documents together with a high-level mapping specification as input and generates target XML documents based on the schema mapping.

The XML transformation system of the present invention may be "scalable" in the sense that the system is adaptable to inputs with large data size—achieving scalability for example, by dynamically switching between main-memory and disk-based procedures based on the size of the XML data input—in contrast to prior art approaches that work for inputs of smaller data size but break down for inputs of larger data size and have no such dynamic switching. For example, for a transformation that requires merging (grouping) in the target, four typical XQuery engines failed (e.g., by running out of memory) at input document size of four megabytes (MB) or less. In contrast to the prior art, a transformation system according to the present invention did not fail with inputs scaled up to gigabyte (GB) size-range. Even when the prior art approaches using existing XQuery engines do run, their overall runtime performance may be one to two orders of magnitude lower (proportional to input size) than embodiments of the present invention run on the same input.

Embodiments of the invention may perform schema mapping-based XML transformation as a three-phase process comprising tuple extraction, XML-fragment generation, and data merging phases, in contrast to prior art approaches to transformation that lack such a phase structure. Embodiments of the invention may perform two computation-intensive phases, tuple-extraction and data merging, during XML transformation with novel methods not seen in the prior art. For tuple extraction, one embodiment may adapt an extraction method (for stored/indexed XML data) to handle streamed XML data, in contrast to prior art algorithms incapable of handling streamed XML data. For data merging, one embodiment may use a hybrid algorithmic method that can dynamically switch between main memory-based and disk-based algorithms based on the size of the XML data to be merged, in contrast to prior art algorithms that do not employ any such type of switching.

Figure 1:
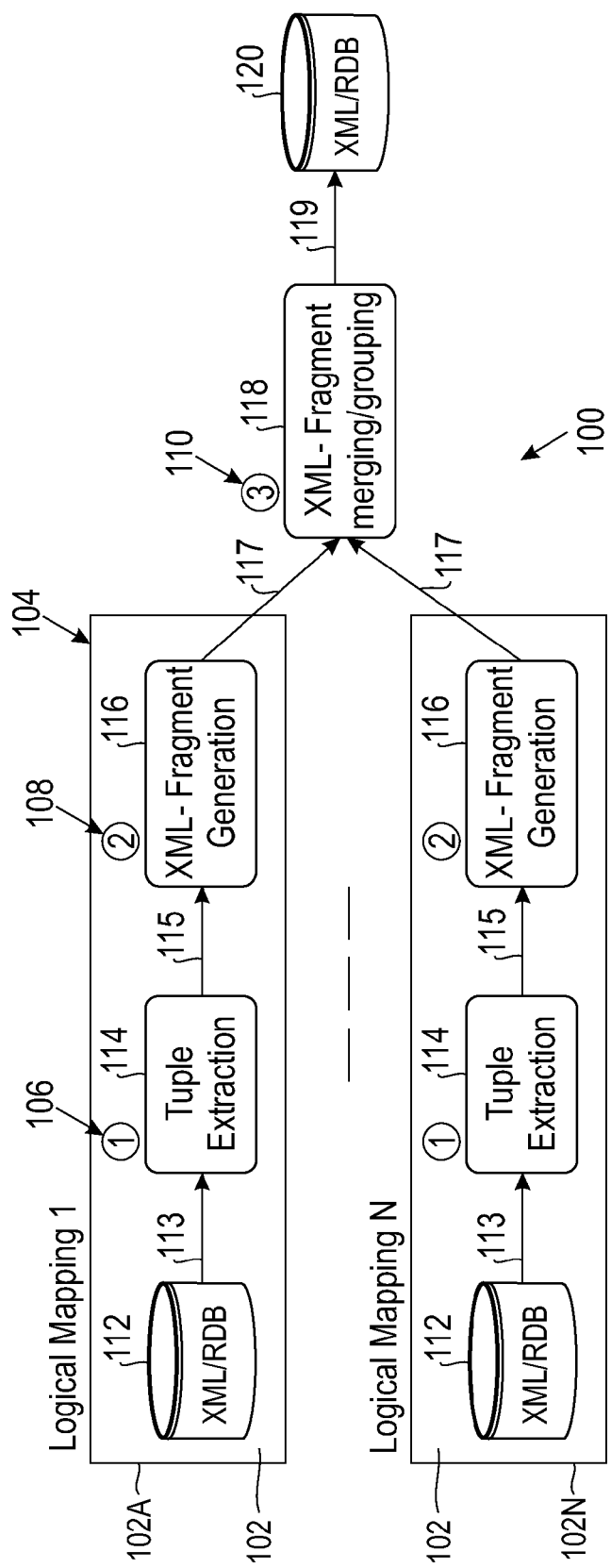
FIG. 1 is a system block diagram illustrating a system for mapping-based XML transformation in accordance with one embodiment of the present invention.

FIG. 1 illustrates mapping-based XML transformation system 100 in accordance with one embodiment of the present invention. System 100 may comprise a multiple number N of logical mappings 102a through 102N, any particular one of which may be referred to as a logical mapping 102. A mapping-based XML transformation 104 prescribed by a logical mapping 102 may be described as a three-phase process comprising a tuple extraction phase 106, an XML-fragment generation phase 108, and an XML-fragment merging phase 110 (also referred to as "data merging"). Mapping-based XML transformation 104 may receive input from one or more databases 112, which may contain, for example, XML data or relational database (RDB) data. The input data 113 may be fed to one or more tuple extraction modules 114. Output 115 of a tuple extraction module (also referred to as "input of an XML-fragment generation module") may be fed as input to an XML-fragment generation module 116. Output 117 of an XML-fragment generation module 116 may be fed as input to a data merging module 118. The output 119 of the mapping-based XML transformation 104 (which may also be output of a data merging module 118) may, for example, be written to a database 120, which may, for example, be identical with or distinct from any or all of databases 112.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
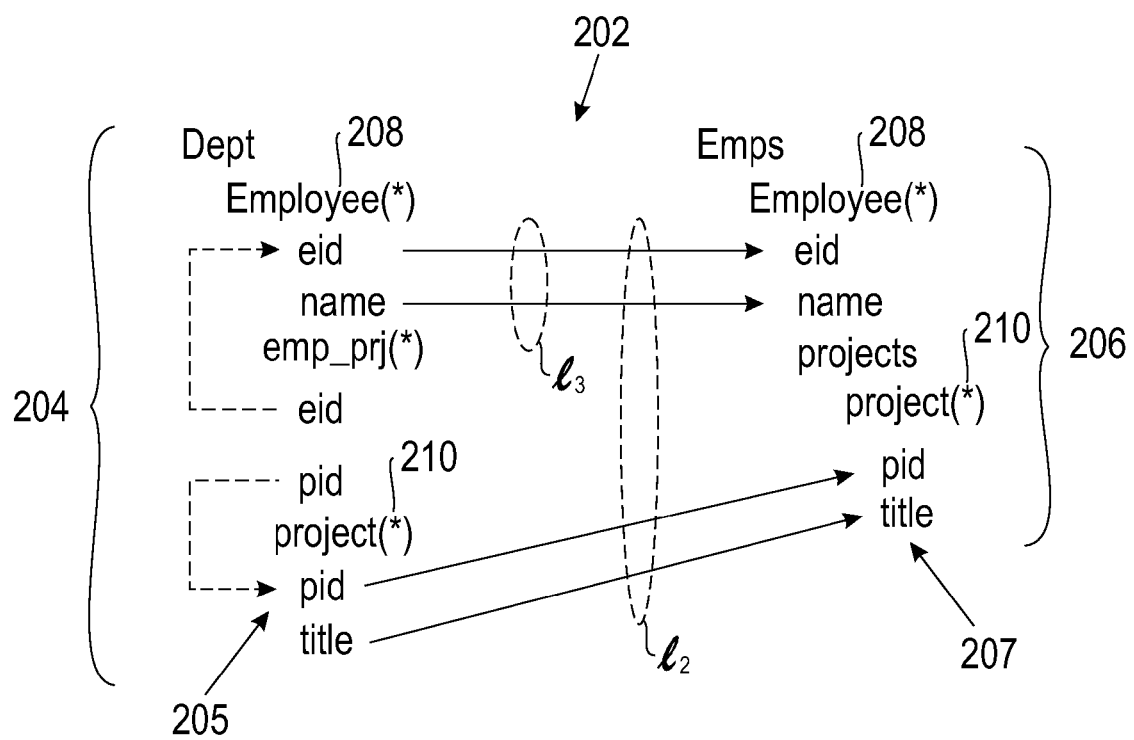
FIG. 2 is a schematic diagram of an XML schema mapping example used to illustrate operation of an embodiment of the present invention.
Figure 3:
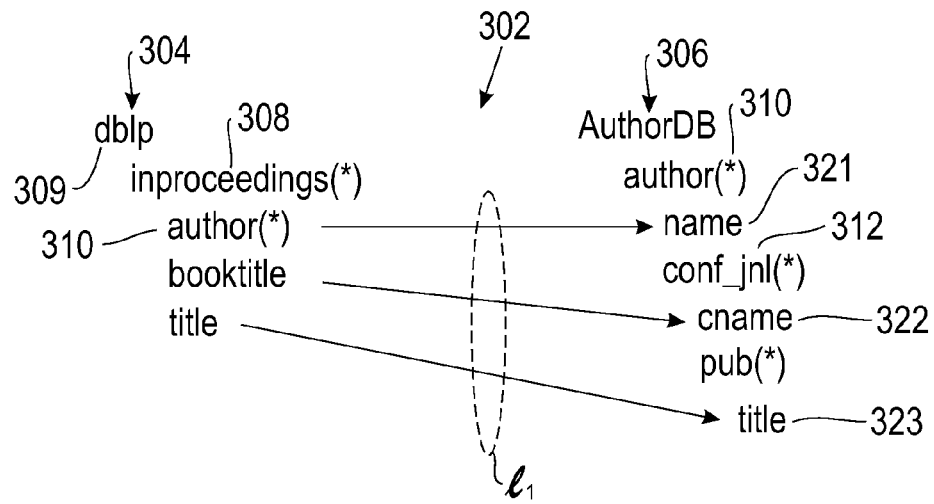
FIG. 3 is a schematic diagram of an XML schema mapping example used to illustrate operation of an embodiment of the present invention.

FIGS. 2 and 3 show examples illustrating schema mappings as represented by the Clio system. An embodiment of the present invention may conveniently (but not necessarily exclusively) be described using the Clio system representation as shown in FIGS. 2 and 3. FIG. 3 shows a simplified example of a schema mapping, which may comprise one logical mapping 302, also labeled as $l_1$ in FIG. 3, and the semantics of which can be expressed as the following tgd (tuple-generating dependency):

---
$l_1$ : for i in dblp.inproceedings, a in i.author
    exists a' in AuthorDB.author, c in a'.conf_jnl, p in c.pub
    where a'.name = a and p.title = i.title and c.name = i.booktitle
---

As shown in FIG. 2, schema mappings in Clio can be represented as a set of tgds 202.
The term "logical mapping" may also be used to refer to one tgd 202. Logical mappings $l_2$ and $l_3$, as set out in the text representation below, are so labeled in FIG. 2.

---
$l_2$ : for e in Dept.employee. ep in Dept.emp_prj, p in Dept.project
    where e.eid = ep.eid and ep.pid = p.pid
    exists e' in Emps.employee, p' in e'.projects.project
    where e'.eid = e.eid and e'.name = e.name
      and p'.pid = p.pid and p'.title = p.title
$l_3$ : for e in Dept.employee
    exists e' in Emps.employee
    where e'.eid = e.eid and e'.name = e.name
---

A tgd 202 may be a constraint between a source schema 204 and a target schema 206 that expresses what pattern 207 of target data should exist (see the exists clause, above, and its associated where clause) given a specific pattern 205 of source data (satisfying the for clause and its associated where clause, if any). Repeatable elements (e.g., repeatable elements 208, 210) may be marked with (*). In a tgd, variables may be used to range over repeatable elements, while a simple projection operator ('.') may be used to navigate through non-repeatable elements. In general, a schema mapping may consist of multiple logical mappings 202, as illustrated in FIG. 2.

Referring to FIG. 3, the logical mapping $l_1$ may map from the DBLP schema 304 (source schema) to an AuthorDB schema 306 (target schema). "DBLP" may be, for example, a collection of computer science bibliography entries published in XML format. The structure of DBLP data may be relatively flat, as reflected, e.g., by only two levels of indentation shown in DBLP schema 304 in FIG. 3. In contrast, AuthorDB may present a more hierarchical view of the data, where entries can be grouped based on author names and conferences—as reflected, e.g., by the four levels of indentation shown in AuthorDB schema 306 in FIG. 3. For simplicity, FIG. 3 and like figures and examples may use a simple nested representation of XML (and relational) schemas that abstracts away certain details that are not essential. For example, repeatable elements (e.g., repeatable elements 308, 310, 312) may be marked with (*). Also, for example, it may not be required that sibling elements in a source document need to exactly match the ordering given in the schema (e.g., DBLP schema 304 could have title appear before author). The leaf nodes (e.g. leaf nodes 321, 322, 323) may be atomic elements that can be mapped. In particular, for example, correspondences between such atomic elements in the source and in the target can be entered by a user in Clio's GUI (or, alternatively, can be inferred by an automated schema matcher). Based on such correspondences, Clio can generate a more precise mapping semantics.

The result of tuple extraction (e.g., output 115 of tuple extraction phase 106) may be a table of flat tuples, such as Table 1, presented below.

TABLE 1

Extracted tuples for $l_1$

| | author | booktitle | title |
|---|---|---|---|
| $t_1$ | A1 | VLDB | T1 |
| $t_2$ | A2 | VLDB | T1 |
| $t_3$ | A1 | ICDE | T2 |
| $t_4$ | A1 | VLDB | T3 |

Each tuple, e.g., $t_1$-$t_4$, may be obtained by taking all the possible instantiations with respect to the source data of the variables in the for clause (see logical mapping $l_1$ above) provided that the associated where clause is satisfied. Then, for each such variable, tuple extraction phase 106 may include all of the variable's atomic subelements that are exported into the target—i.e., the variable's atomic subelements that appear in the where clause of the exists clause(see logical mapping $l_1$ above). For example, given the mapping in FIG. 3 and the source data 402 shown in FIG. 4, tuple extraction phase 106 may produce the four extracted tuples $t_1$-$t_4$, shown in Table 1. The three columns of Table 1 may correspond to the three exported atomic expressions: a, i.booktitle, and i.title (see logical mapping $l_1$ above). The column names in the table may be for reference purposes and can be arbitrary in implementation.

For the logical mapping $l_2$ and the data shown in Table 2, the extracted tuples may be as shown in Table 3.

TABLE 2

Relational data for the example of FIG. 2

| eid | name | eid | pid | pid | title |
|---|---|---|---|---|---|
| e1 | Jack | e1 | p1 | p1 | Schema |
| e2 | Mary | e1 | p2 | | mapping |
| e3 | Linda | e2 | p2 | p2 | DB2 |
| (a) employee | | (b) emp_prj | | (c) project | |

TABLE 3

Extracted tuples for $l_2$

| | eid | name | pid | title |
|---|---|---|---|---|
| $t_1$ | e1 | Jack | p1 | Schema mapping |
| $t_2$ | e1 | Jack | p2 | DB2 |
| $t_3$ | e2 | Mary | p2 | DB2 |

A table of the extracted tuples for the logical mapping $l_3$ may appear the same as Table 2(a). To implement tuple extraction, tuple extraction phase 106 may employ different set of instructions based on the types of data sources and also the semantics of the extraction.

In XML data, repeatable elements (or concepts) may nest among each other according to their application semantics. For example, in the source schema 304 in FIG. 3, we have a set of inproceedings 308 elements under the root element 309 dblp. In turn, each inproceedings element 308 can have a number of author 310 elements. The non-repeatable elements (those not marked (*)) can be seen as the attributes of their parent/ancestor repeatable elements (those marked (*)). The goal to tuple extraction (phase 106) from XML data (e.g. data 113) may be described as being to unnest the nested concepts and form flat tuples for transformation.

The extraction of flat tuples from XML data (e.g. data 113) can be seen as matching of a set-path expression. A set-path expression may be similar to an XPath expression except that each location step may end with a repeatable element (those marked (*) in FIG. 3) and each repeatable element can have multiple atomic subelements or attributes for extraction (e.g. leaf nodes 321, 322, 323). Each repeatable element in a set-path expression may correspond to a bound variable in the for statement of a tgd (see, e.g., mapping $l_1$, above). In addition, as in logical mappings, projection ('.') may be used to express navigation through multiple levels of non-repeatable elements. For the example of FIG. 3, the setpath expression for tuple extraction may be:

$$Q1 = /DBLP \cdot \text{inproceedings}\{title, booktitle\}/author\{.\}$$

Here, the two repeatable elements inproceedings and author may be the end points of the two location steps. Their attributes (within braces) may be the element values to be extracted. To match a set-path expression against an XML document, a publicly available SAX (Simple API for XML, a programming interface (API) for accessing the contents of an XML document. SAX does not provide a random access lookup to the document's contents. It scans the document sequentially and presents each item to the application only one time. If the application does not save the data, it is no longer available.) parser may be used to assemble records corresponding to the set-elements in the set-path expression and then match these records based on their parent-child relationship specified in the expression, as further described by example.

Figure 4:
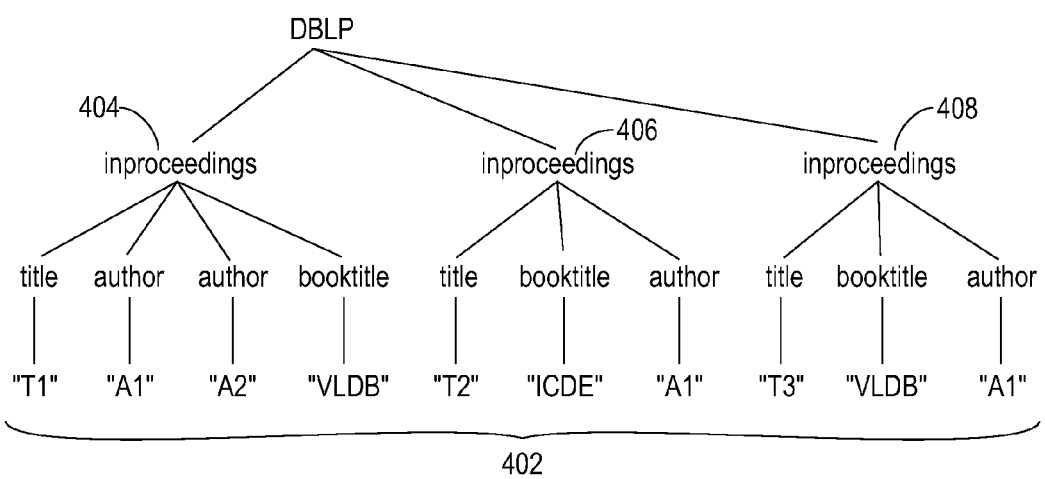
FIG. 4 is diagram providing a source data for an example related to the XML schema mapping example shown in FIG. 3.

For the set-path expression Q1 (see above) and the first two inproceedings elements 404, 406 shown in FIG. 4, the record sequence (generated from the record assembler) may be:

$$a1=[(A1),p1],/a1,a2=[(A2),p1],/a2,p1=[(T1, VLDB),—],/p1,p2=[(T2,ICDE),—],a3=[(A1), p2],/a3,/p2. \quad (R1)$$

A record prefixed with a slash (such as /a1) may be an end-record. An end-record must (to be grammatical) have a preceding start-record, such as a1. Each start-record may have two components: the tuple with extracted values and the id of its parent record. When there is no ambiguity, a start-record may also be called a record. For the record a1, its tuple may be (A1) and the id of its parent record may be p1. The record p1 may have the extracted tuple (T1, VLDB). Since p1 does not have a parent record, record p1 may have a dash symbol (.—.) in its second (id of parent) component.

The record-creation process exemplified by FIG. 4 and the example set-path expression Q1 may illustrate the following points. First, a parent start-record may come after its child start-records. For the example of FIG. 4 and set-path expression Q1, p1 may come after its children a1 and a2. Second, if all the extraction elements of a set-element have arrived, the start-record can be sent on for set-path expression-matching before the set-element closes (i.e., its end-element SAX event arrives). For the example of FIG. 4 and set-path expression Q1, the start-record p2 may be sent before its child record a3. Third, if a set-element has a missing subelement that is specified for extraction, fill the corresponding field may be filled with a null value when the set-element closes. A missing extraction subelement is possible if the corresponding schema subelement is optional.

Figure 5:
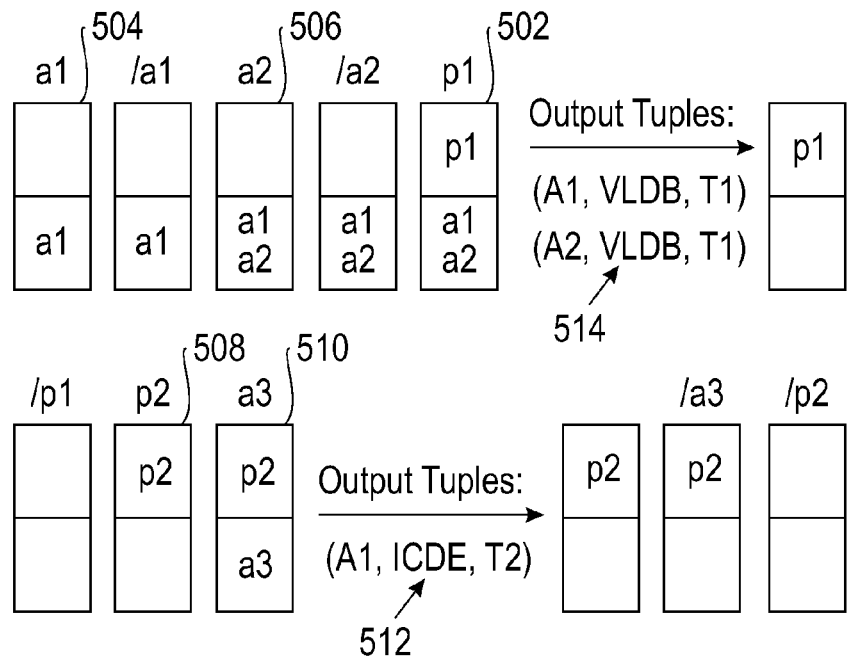
FIG. 5 is a diagram of streaming matching, related to the example shown in FIG. 3, and illustrating operation of one embodiment of the present invention.

FIG. 5 illustrates that actual matching of the set-path expression can take place concurrently as new records arrive from the record assembler. If each record can be regarded as a start-element SAX event, the streamed matching (e.g., matching performed on a streaming input) of simple path expression queries may be performed. For a set-path expression—such as Q1—the parent start-element event may come after the child start-element event, violating the assumption of most prior art streamed matching algorithms, which assume SAX events of elements come in document order. An embodiment of the present invention may handle disordered SAX events by using blocking. For example, if the parent record has not arrived, all its descendant records may be blocked and kept in a buffer, as described by example below. FIG. 5 shows the matching process of the example of FIG. 4 and set-path expression Q1 given the sequence of records (R1, above) generated for the example of FIG. 4.

In FIG. 5, before the start-record p1 (502) comes (e.g., arrives in the sequential output from the SAX parser), its child records a1 (504) and a2 (506) may be blocked by storing them in a record buffer. On the other hand, since p2 (508) comes before its child a3 (510), the matching can be done for p2 and output the result (tuple 512) as soon as a3 (510) arrives. In the worst-case scenario, if a blocked parent record has a large number of child records, all these child records may need to be buffered. A hybrid record buffer may be implemented, for example, which may automatically swap records to a temporary file (e.g., on disk) when the record buffer runs out of allocated physical memory. The swapped records can be read back from disk sequentially.

When there are multiple set-path expressions (from multiple logical mappings) on the same input XML document, it may be possible to coordinate the matching of set-path expressions to achieve better performance. In a first exemplary alternative having a loose-integration approach, all the set-path expressions may share the same SAX parser for reading the XML document while each of them has a separate record assembler and matching module. This first approach may only require one scan of the input document but the computation of matching may not be shared. In a second exemplary alternative having a tight-integration approach, multiple set-path expressions can be merged into a complex (e.g., tree) structure and the multiple set-path expressions matched together. For example, if there is another set-path expression Q2 on top of Q1, $$Q2 = /DBLP \cdot \text{inproceedings}\{title, booktitle\}$$

then Q1 and Q2 can be combined and matched together. In this particular example, the combined structure is the same as Q1. The difference is that, in addition to the outputs (tuple 512 and tuples 514) shown in FIG. 5, the two tuples (VLDB, T1) and (ICDE, T2) should also be output for Q2.

For relational databases, as compared to the description given above for XML data sources, SQL queries can be generated to extract tuples from relational data sources so that the mature relational technology can be taken advantage of. For example, tuple extraction phase 106 can use the following rules to translate the tuple extraction of a logical mapping into an SQL query: (1) the referenced tables in the for statement of the logical mapping appear in the from clause of the SQL query; (2) the conditions in the where statement appear in the SQL where clause, and (3) the referred fields appear in the select clause of the SQL query. For example, the two corresponding SQL queries for the two logical mappings $l_2$ and $l_3$, shown in FIG. 2, may be as follows:

```
q₂ : select eid, name, pid, title
     from employee e, emp_prj ep, project p
     where e.eid = ep.eid and p.pid = ep.pid
q₃ : select eid, name
     from employee
```

In particular, the result of $q_2$ is listed in Table 3. The results of the two SQL queries $q_2$ and $q_3$ may overlap on the employees that have projects. Sometimes there is an advantage to combining these two SQL queries $q_2$ and $q_3$ into one outer-join query $q_{23}$, for example:

```
q₂₃ : select eid, name, pid, title
      from employee e left outer join
          (emp_prj ep inner join project p on p.pid = ep.pid)
          on e.eid = ep.eid
```

Figure 6:
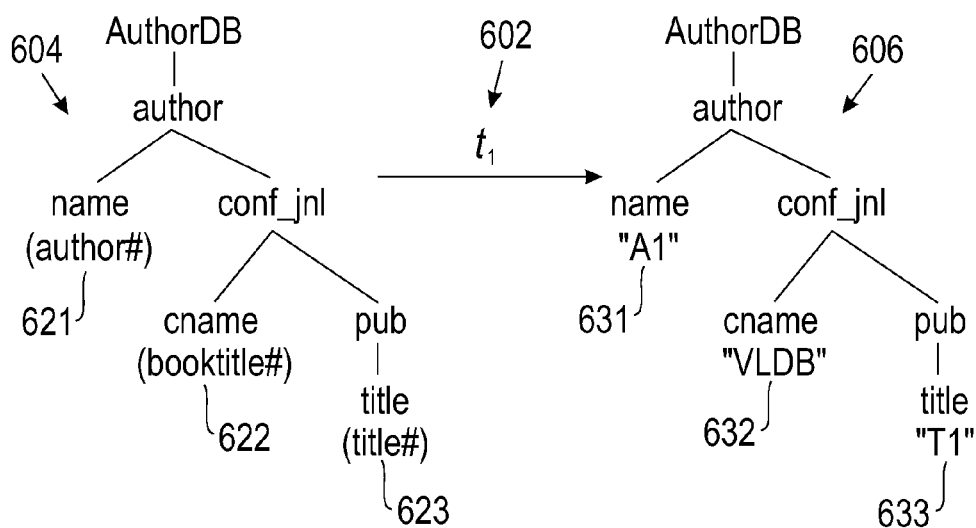
FIG. 6 is a diagram of a template for the example shown in FIG. 3.

Referring again to FIG. 1, the XML-fragment generation phase 106 may take one flat tuple at a time (e.g., from input 115) and transform it into an XML-fragment based on each logical mapping (for example, logical mapping 102a may be logical mapping $l_1$). The transformation 602 may be represented with an XML-fragment template 604 as shown on the left side of FIG. 6. The template 604 may correspond to the exists clause and its associated where clause in a tgd, e.g., logical mapping 302. The leaf nodes (e.g., leaf nodes 621, 622, 623) may be atomic elements and their text values 631, 632, 633 may be instantiated with extracted source fields, e.g., "A1", "VLDB", and "T1", respectively, as shown in FIG. 6. The right side of FIG. 6 shows the resulting XML-fragment 606 for the source tuple $t_1$ (see Table 1). It is possible that the same source field can appear multiple times in the XML-fragment template 604. Conversely, multiple source fields (e.g., in the XML-fragment template 604) can be mapped to the same field in an XML-fragment (e.g., in the XML-fragment 606)—in such a case, a function may be used in the field mapping in order to "combine" the multiple fields into the template field.

Figure 7:
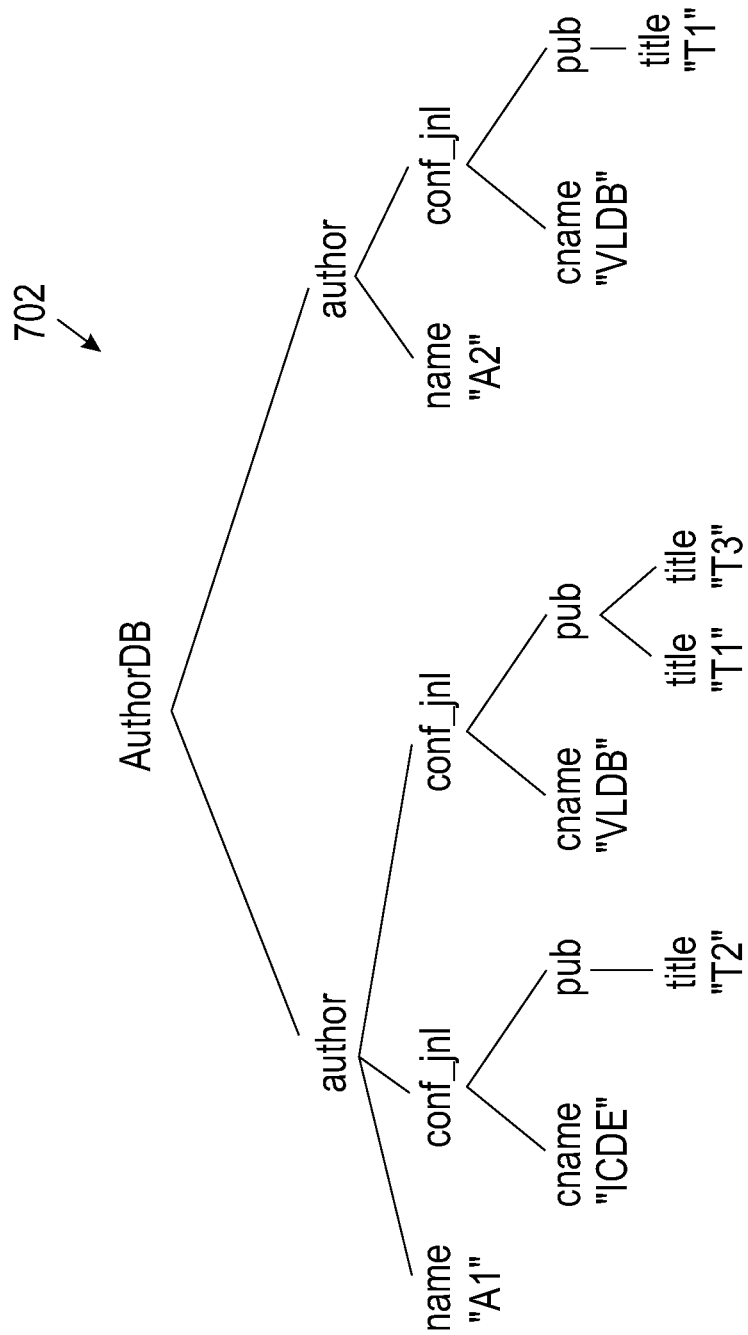
FIG. 7 is a diagram of a target XML document for the example shown in FIG. 3.

Referring once again to FIG. 1, the data merging phase 110 may merge the resulting XML-fragments (e.g., output 117) into one XML document (e.g., output 119 of mapping-based XML transformation 104). Data merging phase 110 may assemble a coherent and non-redundant target instance (such as, e.g., XML document 702, shown in FIG. 7), by eliminating duplicate XML-fragments and, furthermore, by merging XML-fragments that share the same "key" (where "key" may be as described below). For example, the four XML fragments—such as XML-fragment 606—resulting from the four tuples $t_1$-$t_4$, shown in Table 1 and the template 604 shown in FIG. 6 may be merged into the final XML-document 702 shown in FIG. 7. In the final XML-document 702, each author name may appear only once, the relevant conferences may be grouped under each author (again, without duplication for each author), and for each conference, all the relevant publications may be listed underneath (also, without duplication).

For the data merging phase 110 to achieve this merging, name (see FIG. 7, and also see FIG. 7 for the following underlined terms) may be considered to be a key for the top-level author elements, cname may be a key for the conf_jnl elements under each author, and title may be a key for each pub element under a conf_jnl element. In Clio, the default key value of a repeatable element may be the combination of all the atomic values that can be reached from that element without passing through another repeatable element. Moreover, the key of the parent repeatable element may also be included so that, for example, there may be a positively defined reference to the set of conf_jnl elements that are nested under a certain author element and not under a different author element.

The data merging phase 110 may include the following two steps: 1) obtain a single document by merging XML fragments on their common root node (thus, all the resulting XML fragments may be viewed as being stitched together by their root element); and 2) merge sibling repeatable elements that have the same tag and moreover have the same key (to merge such elements, the common structure (the key) may be used to union their corresponding sets of repeatable subelements (tag-wise) and the same merging may then be applied recursively for each of those sets (if any)). The foregoing may be referred to as "nested merging".

The data merging phase 110 may include a hybrid merging method that performs the nested merge of XML-fragments in main memory with linked hash tables and then dynamically switches to sort-based methods (also referred to as "disk-based") if hash tables use up available memory. In particular, the worst-case I/O cost of the sort-based method may be O(N log N), where N may be the size of XML-fragments being merged.

Data merging phase 110 may perform nested merging of XML fragments using main-memory hash tables. Data merging phase 110 may create a chain of hash tables (such as chain 802 seen in FIG. 8) to do the grouping in a top-down fashion defined by the grouping semantics. Since the merging takes place for repeatable elements based on the key values of their parents, data merging phase 110 may create one hash table (e.g., hash tables 804, 806, 808 in FIG. 8) for each repeatable element (e.g., author(*), conf_jnl(*), pub(*), respectively, as seen in FIG. 3) under each distinct parent key entry (e.g., parent key entry 810 "A1", seen in FIG. 8). The process is further described below.

Figure 8:
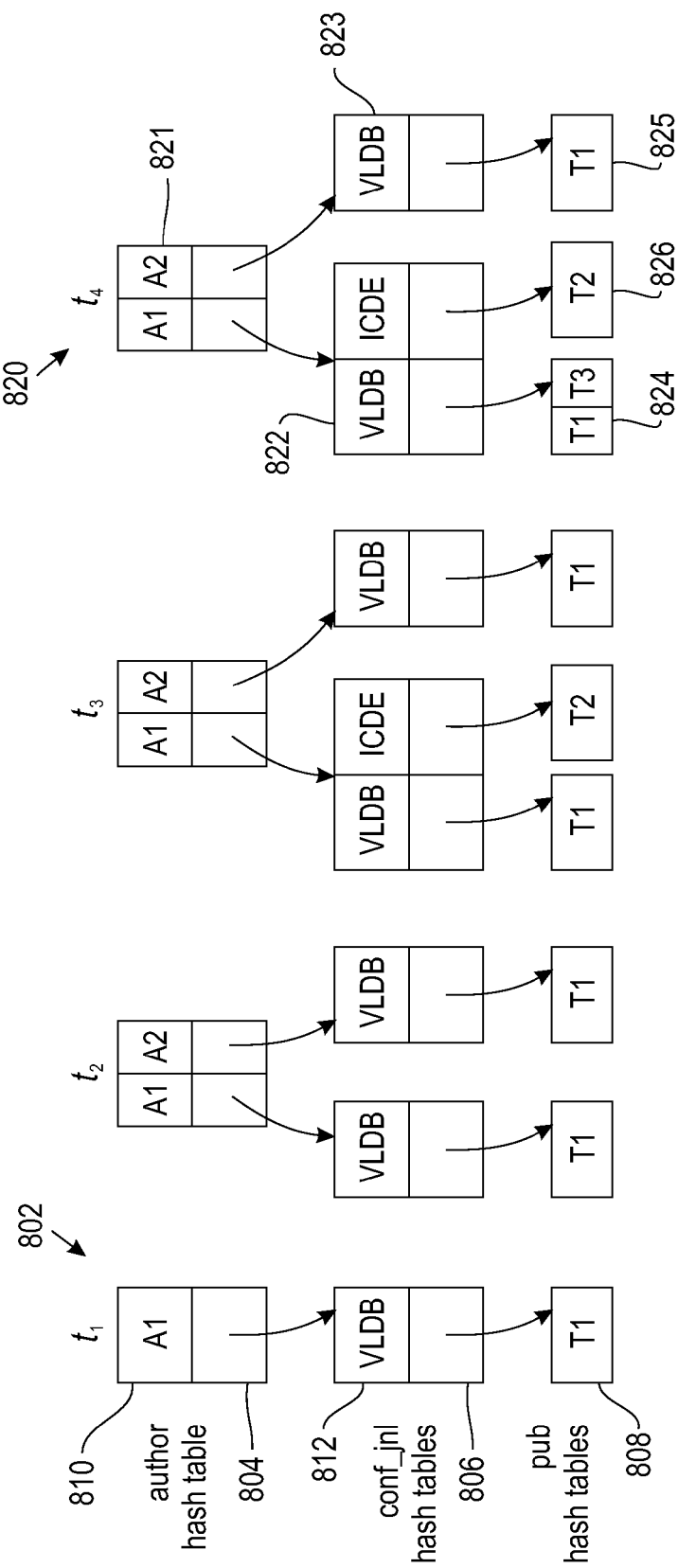
FIG. 8 is a diagram of a process of creating hash tables, related to the example shown in FIG. 3, and illustrating operation of one embodiment of the present invention.

FIG. 8 shows the process of creating hash tables when merging the four XML-fragments for the example of FIG. 3 (one fragment for each of the tuples $t_1$-$t_4$, FIG. 6 illustrating the fragment generated for tuple $t_1$, for example). There may be only one hash table for the top-level author set-element. For each key entry (e.g., key entry 810 with key "name"="A1") of the author element, data merging phase 110 may create a conf_jnl hash table (e.g., hash table 806). Similarly, for each distinct key entry (e.g., key entry 812 with key "cname"="VLDB") in such a hash table (e.g., hash table 806), data merging phase 110 may create a pub hash table (e.g., hash table 806) whose entries may be the distinct values of "title", e.g., "T1", "T2", or "T3"). FIG. 8 shows the evolution of the hash tables with the incoming XML-fragments, in other words, a chain of hash tables is shown for each of the tuples $t_1$-$t_4$ extracted for the example of FIG. 3. Recall, for example, that these XML-fragments were obtained (e.g., in XML-fragment generation phase 108) from the tuples $t_1$, $t_2$, $t_3$, and $t_4$ by applying the transformation 602 described in FIG. 6. Data merging phase 110 may generate the XML document 702 in FIG. 7 by flushing the hash tables (e.g., hash tables 804, 806, 808) for each tuple (e.g., $t_1$, $t_2$, $t_3$, and $t_4$).

The hash-based merging (also referred to as main memory-based merging) can handle target schemas with multiple sibling set-elements. Suppose, in the example illustrated by FIG. 3, the conf_jnl set-element has a sibling set-element book that has the same subtree structure as conf_jnl. The content of the book subtree may be mapped from other data sources on books. With such a mapping, each key in the author hash table (e.g., hash table 804) of FIG. 8 may have two child hash tables, one for conf_jnl (e.g., hash table 806) and the other for book—in other words, these two (child) hash tables share the same key entry (key entry 810 for this example).

Although efficient, the hash-based merging may be limited by the amount of available main memory because all the hash tables must reside in memory for them to work effectively. Data merging phase 110 may provide scalability (e.g., ability to handle XML data having size too large for the hash-based merging to work efficiently) with a sort-based merging (also referred to as disk1-based merging) that builds on top of the hash-based merging to produce a hybrid sort-based merging.

When the hash tables take up all the allocated physical memory, data merging phase 110 may write the hash tables to a disk file as a file-run (see example below) and then free up all the hash tables for subsequent incoming XML fragments. When all the XML fragments are processed into file-runs, data merging phase 110 may merge the disk-resident file-runs.

When outputting a file-run from the linked hash tables (e.g., chain 802 of hash tables 804, 806, 808), to achieve linear I/O cost when merging file-runs, data merging phase 110 may enforce an appropriate ordering among the keys of the same hash table. Specifically, data merging phase 110 may start the serialization from the root hash table (the author hash table in FIG. 8, e.g., hash table 821), sort the key values (e.g., "A1" and "A2" for hash table 821) in a predetermined order (for example, ascending order: A1, A2) and then output the keys in that order. After the output of each key, data merging phase 110 may recursively serialize the output key's child hash tables (e.g., key A1 of hash table 821 has child hash tables 822, 824, 826). (The number, for example, of hash tables may be the same as the number of corresponding sibling set-elements.) For example, the file-run for the final (after $t_4$ is merged) hash tables (e.g., chain 820 of hash tables 821, 822, 823, 824, 825, and 826) in FIG. 8 may be as follows:

A1[ICDE[T2],VLDB[T1,T3]],A2[VLDB[T1]]

For clarity, each list of keys may be enclosed by a pair of [and] (except for the outer-most list, e.g., A1, A2 in this example), and is separated by a comma. In this example, the key "ICDE" (from hash table 822) may appear ahead of (and be said to be "preceding" or "before" or "foremost of") the key "VLDB" (as children of key "A1" from hash table 821) according to the ascending order sorting.

Data merging phase 110 may merge multiple file-runs in one sequential scan (e.g., of XML data input 113). Suppose, for example, data merging phase 110 produces another file-run as follows:

A2[VLDB[T4],WWW[T5]]

To merge the above two file-runs, data merging phase 110 may compare the two first keys (i.e., A1 and A2, respectively) from the file-runs. The current point in each file run may be said to be at the first key of each file run. Since A1 precedes A2 (or is "foremost" of the two keys) in the predetermined (e.g., ascending) order, (and because the keys in each file run are sorted in the predetermined order) there may be nothing else in the second file-run that can merge with A1 so data merging phase 110 may directly output all the content for A1 (including the nested content). Now, the current point in the first file-run becomes A2. The two file-runs then have the same key at the current point of each file run. As a result, data merging phase 110 may output key A2 and then recursively merge the two smaller file-runs nested inside these two keys (e.g., VLDB[T1] and VLDB[T4], WWW[T5], respectively). The result of the merge may be as follows:

A1[ICDE[T2];V LDB[T1;T3]];A2[V LDB[T1;T4];
    WWW[T5]]

Data merging phase 110 may perform scalable data merging by creating file-runs from hash tables and merging file-runs in one sequence scan. Usually, each file-run may require a small amount of physical memory (such as the size of one disk page, for example) during the data merging phase 110. If the number of file-runs becomes extremely large, however, there may not even be enough main memory to allocate one disk page for each file-run. In that case, since the output of the sort-based merge may also be a valid file-run, data merging phase 110 can apply multi-stage merging as commonly used in relational databases.

It should be understood, of course, that the foregoing relates to exemplary embodiments of the invention and that modifications may be made without departing from the spirit and scope of the invention as set forth in the following claims.

We claim:

1. A computer-implemented method for use with an extensible markup language (XML) document, comprising:
   inputting a high-level mapping specification for a schema mapping;
   performing, by the execution of a computer processor, a tuple extraction phase on stored XML data wherein the tuple extraction includes unnesting nested concepts to form flat tuples;
   creating XML fragments from the flat tuples;
   removing duplicate ones of the XML fragments;
   creating keys for the XML fragments;
   performing a data merging phase on the stored XML data, wherein the data merging includes:
      using a hybrid algorithmic method that dynamically switches between main memory-based and disk-based algorithms based on the size of the XML data to be merged;
      creating a plurality of chains of hash tables, wherein one of the plurality of chains of hash tables is created for each of the flat tuples;
      ordering a plurality of keys for each of the hash tables;
      sorting the hash tables by sorting the plurality of keys for each of the hash tables;
      merging the sorted hash tables;
      merging those of the XML fragments that share a single one of the keys; and
   generating a target XML document based on the mapping.

2. The method of claim 1, further comprising:
   extracting tuples for the schema mapping.

3. The method of claim 1, further comprising:
   extracting tuples for the schema mapping; and
   generating an XML fragment for each tuple.

4. The method of claim 1, further comprising:
   extracting tuples for the schema mapping;
   generating an XML fragment for each tuple;
   merging all the generated XML fragments into the target XML document; and
   merging repeatable elements with a same tag and a same key and joining the merged repeatable elements into the target XML document.

5. A system comprising a computer processor for scalable extensible markup language (XML) transformation based on schema mappings,
   wherein the computer processor is configured to perform a streaming operation using a computer processor for tuple extraction on a streamed XML input,
   wherein the tuple extraction includes unnesting nested concepts to form flat tuples, and
   wherein the computer processor is configured to:
      create XML fragments from the flat tuples;
      remove duplicate ones of the XML fragments;

create keys for the XML fragments;
use a hybrid algorithmic method that dynamically switches between main memory-based and disk-based algorithms based on a size of the XML fragments;
create a plurality of chains of hash tables, wherein one of the plurality of chains of hash tables is created for each of the flat tuples;
order a plurality of keys for each of the hash tables;
sort the hash tables by sorting the plurality of keys for each of the hash tables; and
merge the sorted hash tables;
merge those of the XML fragments that share a single one of the keys; and
generate, based on the schema mappings, a target XML document from the streamed XML input.

6. The system of claim 5, wherein the streaming operation for tuple extraction further comprises:
matching a set-path expression against an XML document provided by the streamed XML input using a blocking process.

7. The system of claim 5, wherein the streaming operation for tuple extraction further comprises:
assembling records corresponding to set-elements in a set-path expression, wherein a parent record comes after one of the parent record's child elements; and
storing the parent record's child elements in a buffer until the parent record arrives.

8. The system of claim 5, wherein the streaming operation for tuple extraction further comprises:
assembling records corresponding to set-elements in a set-path expression;
storing a first parent record's child elements in a buffer until the first parent record arrives; and
performing a set-path expression matching concurrently with arrival of new records.

9. The system of claim 5, wherein the streaming operation for tuple extraction further comprises:
assembling records corresponding to a set-element in a set-path expression, wherein the set element has a start-record and an end-record;
if all extraction elements of the set-element have arrived, sending the start-record to set-path expression matching before the end-record arrives; and
creating a hash table for each repeatable set-element for use in merging the assembled records.

10. A computer program product, for use with extensible markup language (XML) data having a size, the computer program product comprising a non-transitory computer useable medium including a computer readable program, wherein the computer readable program when executed on a computer causes the computer to:
extract flat tuples from the XML data by unnesting nested concepts to form flat tuples;
create XML fragments from the flat tuples;
remove duplicate ones of the XML fragments;
create keys for the XML fragments;
create a plurality of chains of hash tables, wherein one of the plurality of chains of hash tables is created for each of the flat tuples;
order a plurality of keys for each of the hash tables;
sort the hash tables by sorting the plurality of keys for each of the hash tables:
merge the sorted hash tables
execute a main memory-based set of instructions configured to merge the XML fragments from the XML data;
execute a disk-based set of instructions configured to merge the XML fragments from the XML data; and
dynamically switch between the main memory-based set of instructions and the disk-based set of instructions based on the size of the XML data to be merged.

11. The computer program product of claim 10, wherein the main memory-based set of instructions comprises:
instructions for hash-based merging;
instructions for writing hash tables generated by the hash-based merging instructions to disk when the hash tables generated by the hash-based merging instructions fill the main memory allocated to the hash tables generated by the hash-based merging instructions; and
freeing up the hash tables generated by the hash-based merging instructions in main memory for subsequent XML fragments from the XML data.

12. The computer program product of claim 11, wherein the disk-based set of instructions comprises:
outputting one file run from a group of linked hash tables in response to the linked hash tables using up all the available main memory; and
merging, in a single sequential scan, multiple file runs output from the linked hash tables.

13. The computer program product of claim 12, wherein outputting a file run comprises:
starting serialization from a root hash table of the group of linked hash tables;
sorting the keys by key value in a predetermined order; and
outputting the keys in the sorted order.

14. The computer program product of claim 13, wherein outputting a file run further comprises:
after each of the keys is output, recursively serializing a plurality of child hash tables of each of the keys.

15. The computer program product of claim 12, wherein merging multiple file runs comprises:
comparing current keys of all the file runs;
in response to the current keys of all the file runs not being equal, outputting content for a foremost key and updating a current key for a file run with the foremost key; and
in response to the current keys of all the file runs being equal, outputting one of the current keys and recursively merging those of the file runs nested inside the current keys.

* * * * *